US009704544B2

(12) United States Patent
Halbert et al.

(10) Patent No.: US 9,704,544 B2
(45) Date of Patent: Jul. 11, 2017

(54) METHOD, APPARATUS AND SYSTEM TO MANAGE IMPLICIT PRE-CHARGE COMMAND SIGNALING

(71) Applicant: Intel Corporation, Santa Clara, CA (US)

(72) Inventors: John B. Halbert, Beaverton, OR (US); Bruce A. Christenson, Forest Grove, OR (US); Kuljit S. Bains, Olympia, WA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/360,675

(22) Filed: Nov. 23, 2016

(65) Prior Publication Data

US 2017/0140801 A1 May 18, 2017

Related U.S. Application Data

(63) Continuation of application No. 14/498,509, filed on Sep. 26, 2014, now Pat. No. 9,530,468.

(51) Int. Cl.
*G06F 12/00* (2006.01)
*G11C 7/10* (2006.01)
*G06F 13/16* (2006.01)

(52) U.S. Cl.
CPC ........ *G11C 7/1072* (2013.01); *G06F 13/1689* (2013.01); *G11C 7/1063* (2013.01)

(58) Field of Classification Search
None
See application file for complete search history.

(56) References Cited

U.S. PATENT DOCUMENTS

| 6,747,912 | B1 | 6/2004 | Riesenman |
| 7,167,946 | B2 | 1/2007 | Osborne |
| 7,752,411 | B2 | 7/2010 | Osborne et al. |
| 8,130,576 | B2 | 3/2012 | Bains et al. |
| 8,385,146 | B2 | 2/2013 | Bains et al. |

(Continued)

FOREIGN PATENT DOCUMENTS

WO   WO-2014085267   6/2014

OTHER PUBLICATIONS

International Search Report and Written Opinion from PCT/US2015/045947 mailed Dec. 24, 2015, 16 pgs.

(Continued)

*Primary Examiner* — Brian Peugh
(74) *Attorney, Agent, or Firm* — Blakely, Sokoloff, Taylor & Zafman LLP

(57) ABSTRACT

Techniques and mechanisms for exchanging information between a memory controller and a memory device. In an embodiment, a memory controller receives information indicating for a memory device a threshold number of pending consolidated activation commands to access that memory device. The threshold number indicated by the information is less than a theoretical maximum number of pending consolidated activation commands, the theoretical maximum number defined based on timing parameters of the memory device. In another embodiment, the memory controller limits communication of consolidated activation commands to the memory device based on the information indicating the threshold number.

17 Claims, 6 Drawing Sheets

(56) References Cited

U.S. PATENT DOCUMENTS

| | | | |
|---|---|---|---|
| 8,966,209 B2* | 2/2015 | Post | G06F 3/0608 |
| | | | 711/170 |
| 9,009,433 B2* | 4/2015 | Ryu | G06F 12/02 |
| | | | 711/165 |
| 2003/0217223 A1 | 11/2003 | Nino, Jr. et al. | |
| 2005/0108469 A1 | 5/2005 | Freeman et al. | |
| 2007/0150688 A1 | 6/2007 | Osborne et al. | |
| 2008/0037353 A1 | 2/2008 | Rajan et al. | |
| 2013/0282927 A1 | 10/2013 | Zhao et al. | |
| 2014/0006699 A1 | 1/2014 | Bains et al. | |
| 2014/0095780 A1 | 4/2014 | Bains et al. | |

OTHER PUBLICATIONS

Office Action for Taiwan Patent Application No. 104127375, mailed Aug. 9, 2016, 1-3 pgs.

International Preliminary Report on Patentability from PCT/US2013/045947 mailed Apr. 6, 2017, 14 pgs.

* cited by examiner

METHOD, APPARATUS AND SYSTEM TO MANAGE IMPLICIT PRE-CHARGE COMMAND SIGNALING

CROSS-REFERENCE TO RELATED APPLICATIONS

This application is a continuation of U.S. patent application Ser. No. 14/498,509, filed on Sep. 26, 2014, now U.S. Pat. No. 9,530,468, the entire contents of which are hereby incorporated by reference herein.

BACKGROUND

1. Technical Field

The present invention relates to memory devices and, more particularly, to accessing memory cells of a volatile memory device.

2. Background Art

Computing systems generally rely on memory devices to store information. Such memory devices may be divided into two general types. First, volatile memory devices which require power to maintain correctness of the stored information. Second, non-volatile memory devices which maintain the stored information even after power is cut off.

One common type of volatile memory device is Dynamic Random Access Memory (DRAM). DRAM devices generally provide significantly improved performance over mechanical storage devices (such as hard disks), while providing lower cost, higher storage densities and less power consumption in comparison to other memory technologies, including and most notably, static random access memory (SRAM) devices. However, these benefits come at the cost of incurring various delays in accessing the memory cells making up a DRAM device, both at regular intervals, and in the time periods immediately before and after each access to either read data from the memory cells or to write data to the memory cells.

DRAMs generally store each bit of data in a separate capacitor within an integrated circuit. Since capacitors leak charge, the information eventually fades unless the capacitor charge is refreshed periodically. Because of this refresh requirement and other design considerations, DRAMs designers impose various timing constraints on operations within a DRAM to maintain correctness. One such constraint is a precharge requirement. In particular, when access is requested to a different row (also referred to as a Bit Line (BL)) in a DRAM, the current row has to be first deactivated by issuing a "precharge" command. The precharge command will cause the sense amplifiers to switch off and the bit lines to be precharged to matching voltages that are intermediate between high and low logic levels. After a certain row precharge time period delay (also referred to as tRP), an "activate" command may be issued to activate the next row to be accessed.

BRIEF DESCRIPTION OF THE DRAWINGS

The various embodiments of the present invention are illustrated by way of example, and not by way of limitation, in the figures of the accompanying drawings and in which.

DETAILED DESCRIPTION

Figure 1:
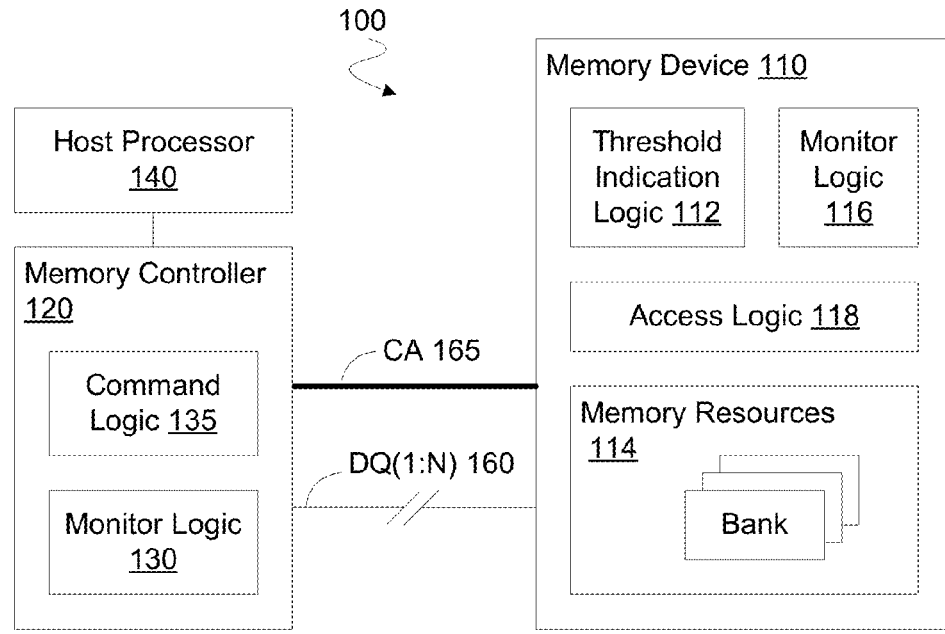
FIG. 1 is a high-level functional block diagram illustrating elements of a system for providing memory accesses according to an embodiment.

Embodiments discussed here in variously provide techniques and/or mechanisms to limit communication of at least one type of consolidated commands from a memory controller to a memory device. In one such embodiment, the memory controller includes circuitry to receive information indicating a threshold number of consolidated commands that may be pending at any given time at the memory device. The threshold number may be distinguished from—e.g., less than—a theoretical maximum number of concurrently pending consolidated commands. Such a theoretical maximum may be defined, for example, based on timing parameters that characterize operation of the memory device.

Certain embodiments are discussed herein with respect to a particular type of consolidated command, referred to herein as a "consolidated Activate/implicit Precharge" command (or simply an "ACT/iPRE" command). However, such discussion may be extended to additionally or alternatively apply to any of a variety of other types of consolidated commands, according to different embodiments. A consolidated ACT/iPRE command is to explicitly specify to a memory device the performance of an activation operation—e.g., to open a row of memory. However, due to functionality available at the memory device, hint information included in such a consolidated ACT/iPRE command may be further interpreted as implicitly commanding the performance of an additional precharge operation—e.g., to close a different row of memory that is already open.

It is refresh operations, precharge operations, activate operations as well as other maintenance operations that impose the various delays that are suffered as a result of employing DRAM technology. These delays have the effect of limiting the rate at which data may be written to or read from DRAM devices. Moreover circuitry to coordinate memory accesses according to DRAM timing constraints uses valuable integrated circuit (IC) real estate and adds to production costs. Although existing memory devices include circuitry to support co-pending ACT/iPRE commands, conventional memory architecture design does not contemplate the possibility that—where co-pending ACT/iPRE commands are supported—such circuitry might support less than a theoretical maximum number of ACT/iPRE commands otherwise defined by the memory controller based on the memory device's timing parameters. To date, it has been generally accepted as a design constraint that a memory device must accommodate the theoretical maximum of ACT/iPRE commands that a memory controller could potentially send according to the timing parameters of that memory device.

Certain embodiments arise from a realization that mechanisms may be provided to set a limit on the allowable number of co-pending ACT/iPRE commands that is less than a theoretical limit defined based on timing parameters. Such embodiments allow a memory device to avoid diminishing returns, in terms of space efficiency and/or other resource efficiency, that are associated with providing support at a memory device for incrementally larger numbers of co-pending ACT/iPRE commands.

FIG. 1 illustrates elements of a system 100 for exchanging commands to access memory resources according to an embodiment. System 100 may include memory device 110 coupled to memory controller 120—e.g. where memory controller 120 is to provide access to memory device 110 for a host processor 140 which is included in or coupled to system 100.

Memory device 110 may include any of a variety of types of memory technology that, for example, have rows of memory cells, where data is accessible via a wordline or the equivalent. In one embodiment, memory device 110 includes dynamic random access memory (DRAM) technology. Memory device 110 may be an integrated circuit package within a larger memory device (not shown) of system 100. For example, memory device 110 may be a DRAM device of a memory module such as a dual in-line memory module (DIMM).

Memory device 110 may include memory resources 114, which represent one or more logical and/or physical groups of memory. An example of one such grouping of memory is a bank of memory resources which, for example, may include an array of storage elements arranged in rows and columns. Memory device 110 may include access logic 118 to facilitate, at least in part, access to memory resources 114—e.g. where such access is provided for servicing one or more commands from memory controller 120. Access logic 118 may include, or operate in conjunction with, logic of memory device 110 which provides resource access according to conventional techniques—e.g. where functionality of threshold indication logic 112, monitor logic 116 and/or access logic 118 supplements such conventional techniques with additional functionality discussed herein. For example, threshold indication logic 112 may communicate information indicating a threshold number of pending ACT/iPRE commands for memory device 110. Alternatively or in addition, monitor logic 116 may detect that a given ACT/iPRE command indicates both an activation operation to be performed and a precharge operation to be performed.

Memory controller 120 may send commands or instructions to memory device 110 over one or more buses, as represented by the illustrative command/address (CA) bus 165. Such commands may be interpreted by memory device 110—e.g. including memory device 110 decoding command information to perform a variety of access functions within the memory and/or decoding address information with column logic and/or row logic. For example, such logic may access a specific location in memory resources 114 with a combination of a column address strobe or signal (CAS) and a row address strobe or signal (RAS). Rows of memory may be implemented in accordance with known memory architectures or their derivatives. Briefly, a row of memory resources 114 may include one or more addressable columns of memory cells, as identified by the CAS generated by column logic of memory 110. The rows may each be variously addressable via the RAS generated by row logic of memory 110.

Access to memory resources 114 may be for the purpose of writing data exchanged—and/or reading data to be exchanged—via a data bus coupled to I/O circuitry (not shown) of memory 110. For example, N data bus signal lines DQ(1:N) 160 may couple such I/O circuitry to memory controller 120 and/or one or more other memory devices (not shown).

In an embodiment, memory controller 120 includes command logic 135—e.g. including any of a variety of hardware logic and/or executing software logic—to send commands via CA 165. Command logic 135 may include or couple to logic of memory controller which performs operations to generate, transmit or otherwise determine commands sent according to one or more conventional techniques. By way of illustration and not limitation, command logic 135 may supplement otherwise conventional command/address signaling functionality which, for example, conforms to some or all requirements of a dual data rate (DDR) specification such as the DDR4 SDRAM JEDEC Standard JESD79-4, September, 2012 or the like. For example, memory controller 120 may include monitor logic 130 comprising circuitry and/or executing software configured to determine a type of a command signaling to be asserted by (e.g. sent from) command logic 135. Monitor logic 130 may control such commend signaling to accommodate a limited command response capability of memory 110.

In an embodiment, monitor logic 130 includes, maintains or otherwise has access to information indicating a command response capability of memory 110, information indicating a status of pending operations within memory 110 and/or information indicating one or more yet-to-be-serviced accesses to memory device 110. Such information may provide an indication of whether or not a row to be accessed in a given bank of memory device 110 is already open, and if not, whether or not a different row in the same bank is already open. If the row to be accessed is determined to already be open, then the access may be carried out without the transmission of a row activate (ACT) command. However, if the row to be accessed is determined to not already be open, then command logic 135 may transmit to memory device 110 an activate command (e.g. a row activate command) which includes a value specifying whether a bank targeted by the command includes a row which is currently open. Such a value (referred to herein as hint information) may indicate to the memory device 110 that it is to internally generate its own implicit precharge (iPRE) command to perform a precharge operation to close the currently open row—e.g. independent of memory device 110 receiving any explicit command to perform such precharge operation. Alternatively or in addition, monitor logic 130 (and/or other logic of memory controller 120) may access such information to determine—for example—how many commands of a particular type are currently pending at memory 110—e.g., where a pending command is one that memory 110 has received but has not yet completed servicing.

Alternatively or in addition, memory device 110 may include monitor logic 116 to evaluate some or all of a command received via CA 165—e.g. to determine whether a command is further implicitly indicating that another command is to be generated internally by memory device 110. By way of illustration and not limitation, monitor logic 116 may determine whether a command is targeting a bank which includes a page which is currently open. The targeting of such a bank is referred to as a "page miss event" (or, for brevity, simply a "page miss"). In response to monitor logic 116 identifying a page miss event corresponding to a command received via CA 165, monitor logic 116 may perform operations to prepare for accessing of memory resources targeted by the command. As discussed herein, such operations may include memory device 110 internally generating signaling to function in the place of one or more commands received from memory controller 120. For example, memory 110 may provide to access logic 118 signals which are functionally equivalent in one or more respects with a precharge (PRE) command from memory controller 120. Accordingly, access logic 118 may perform operations to precharge a row (or rows) of memory resources 114 independent of memory 110 receiving any explicit PRE command specifying such precharge operations.

For the sake of brevity, "ACT/iPRE" is used herein to refer to an ACT command that implicitly indicates to a memory device that an iPRE is also to be implemented (in addition to the activation operation indicated). Servicing of such an ACT/iPRE command by a memory device requires monitoring circuitry to assure that timing constraints of the memory device are not violated. For example, such constraints may include a timing parameter tRP representing a required time to perform a memory precharge operation and/or a timing parameter tRRD representing a required time between successive activation operations. The timing requirements may impose a theoretical limit on the total number of ACT/iPRE commands which can be concurrently pending at a memory device. By way of illustration and not limitation, the total number of copending ACT/iPRE commands may be based on a total number of tRP time periods that can take complete during a tRRD time period.

Figure 2:
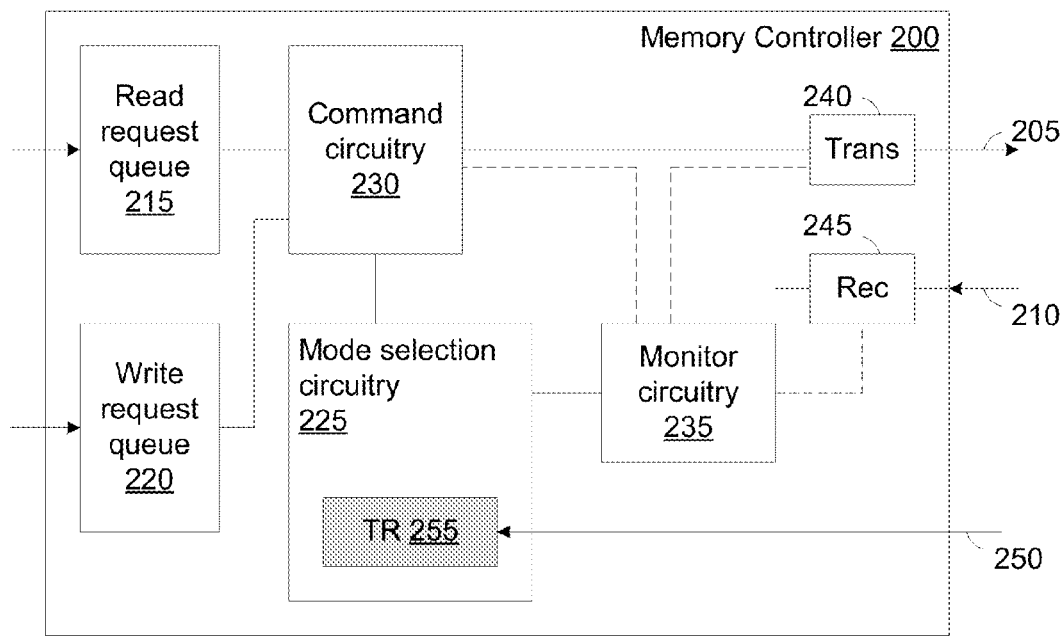
FIG. 2 is a high-level functional block diagram illustrating elements of a memory controller for generating memory access commands according to an embodiment.

FIG. 2 illustrates elements of a memory controller 200 according to an embodiment to generate memory access commands based on an identified limit to a command response capability of a memory device. Memory controller 200 may control access to memory resources such as those of memory device 110. In an embodiment, memory controller includes some or all of the features of memory controller 120.

FIG. 2 may include circuitry, as represented by the illustrative read request queue 215 and write request queue 22, to receive requests to access a memory device (not shown). Read requests from read request queue 215 and write requests from write request queues 220 may be provided to command circuitry 230 configured to select, schedule and/or otherwise determine commands to implement memory accesses in response to these requests. Mode selection circuitry 225 may decide whether command circuitry 230 should be in one of multiple possible modes—e.g., based at least in part on a state of a memory device (e.g., an IC die, not shown) that is coupled to memory controller 200. In such a first mode, command circuitry 230 may schedule a precharge (PRE) command and an activation (ACT) command as separate single commands. In a second such mode, command circuitry 230 may instead schedule a consolidated ACT/iPRE command. Commands scheduled by command circuitry 230 may be provided by transmitters 240 to a link 205 coupling memory controller to the memory device. Transmitters 240 are one example of an I/O interface to link 205. Memory controller 200 may also include receivers 245 to receive signals from the memory device via a link 210. There may be additional modes of memory controller, according to various embodiments.

In some embodiments, memory controller 200 includes monitor circuitry 235 configured to monitor an activity and/or other state of a memory device coupled to memory controller 200, and based on the monitoring, to provide a state indicator that is indicative of the state. In different embodiments, monitor circuitry 235 interfaces with different circuits. Dashed lines show different possibilities for different embodiments. For example, in some embodiments, monitor circuitry 235 monitors signals associated with command circuitry 230, in other embodiments monitor circuitry 235 monitors signals associated with transmitters 240, and in yet other embodiments monitor circuitry 235 monitors signals associated with receivers 245. In still other embodiments, monitor circuitry 235 could monitor signals associated with other circuitry and/or a combination of command circuitry 230, transmitters 240 and/or receivers 245.

The state indicator provided by monitor circuitry 235 may be a single signal such as a single bit or a multi-bit number, or it may a combination of signals indicating different aspects of the signals associated with the circuits. In some embodiments, monitor circuitry 235 provides the state indicator directly to mode selection circuitry 225 and in other embodiments, there is intermediate circuitry.

The following are some examples of monitored state and provided state indicators. In some embodiments, monitoring with monitor circuitry 235 includes monitoring consolidated ACT/iPRE commands which are sent from memory controller 200 to a given memory IC or other memory device—e.g., via links 205. Alternatively or in addition, such monitoring may include monitoring acknowledgements and/or other responses received in response to such consolidated ACT/iPRE commands—e.g., where such acknowledgements and/or other responses are received via links 210. For each of some or all such ACT/iPRE commands, monitor circuitry 235 may monitor a period of time that has expired since a particular stage of communication and/or processing of the ACT/iPRE command. Alternatively or in addition, such monitoring may include maintaining a count of a total number of consolidated ACT/iPRE commands that are currently pending (e.g., received but not yet serviced) at a particular memory device.

In an embodiment, mode selection circuitry 225 receives or otherwise detects information indicating, for a particular memory device, a threshold total number of consolidated ACT/iPRE commands that may be currently pending at that memory device at any given time. Based on such information, mode selection circuitry 225 may include (e.g., store), have access to or otherwise be configured based on a value of such a threshold number—as represented by the illustrative TR 255. By way of illustration and not limitation, TR 255 may be determined in response to a communication 250 received by memory controller 200 during (for example) a stage of fabrication, packaging, assembly or other processing to produce a system including memory controller 200 and the memory device. Communication 250 may be received from the memory device itself—e.g., via links 210—although certain embodiments or not limited in this regard. In another embodiment, communication 250 is received during operation of memory controller 200 as part of a memory system. For example, memory controller 200 may receive communication 250 during a boot-up, wake-up or other power state transition of such a system.

In different embodiments, memory controller 200 may use different approaches to decide whether to be in the first or second mode. For example, monitor circuitry 235 may provide to mode selection circuitry 225, directly or indirectly, a state indicator indicating a current total number of ACT/iPRE commands that are currently pending at a particular memory device (e.g., a memory IC) coupled to memory controller. Based on such a state indicator, mode selection circuitry 225 may evaluate whether the memory device is currently capable of receiving a next ACT/iPRE command. In some embodiments, mode selection circuitry 225 compares the state indicator provided by monitor circuitry 235 to TR 255. If the state indicator has a first relationship with TR 255 (for example, greater than or greater than or equal to), then the first mode of command circuitry 230 is configured, during which command signaling to indicate an activation operation and a precharge operation is performed with an ACT command and an explicit PRE command that is distinct from that ACT command. If the state indicator has a second relationship with TR 255 (for example, less than or less than or equal to), then the second mode of command circuitry 230 is configured, during which a consolidated ACT/iPRE command is used to indicate both an activation operation and a precharge operation.

Figure 3:
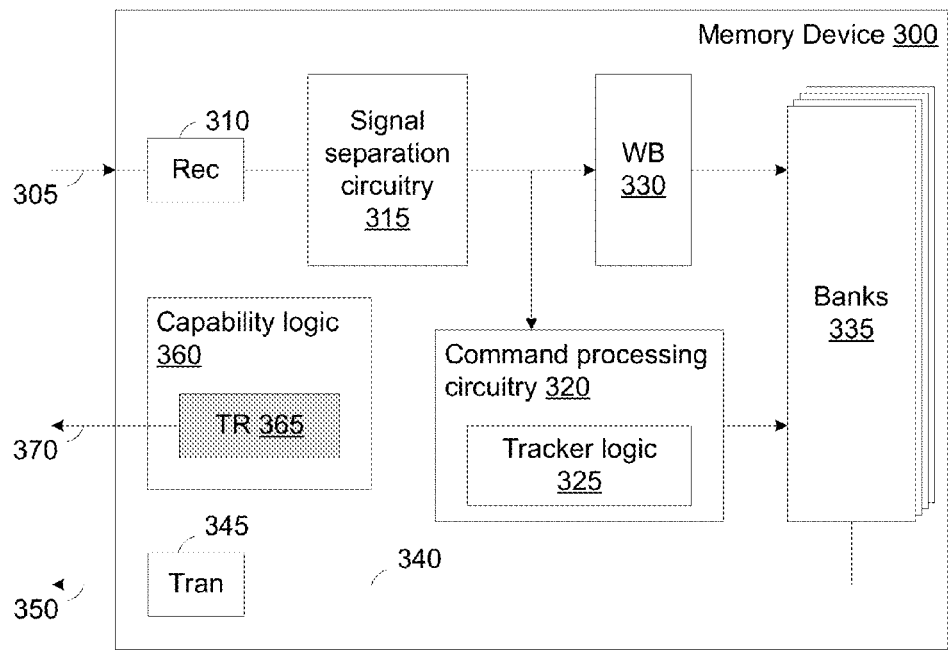
FIG. 3 is a high-level functional block diagram illustrating elements of a memory device to provide access to memory resources in response to memory commands according to an embodiment.

FIG. 3 illustrates details of memory device 300 according to some embodiments, although the inventions are not limited to these details. Memory device 300 represents one example of a memory chip, package or other such device to communicate to a memory controller (not shown) a maximum allowable number of copending consolidated ACT/iPRE commands for the memory device. Such a maximum allowable number may be less than a theoretical maximum that, for example, the memory controller might otherwise operate based on timing constraints of the memory device. Memory device 300, which may include some or all of the features of memory device 110 for example, may exchange threshold information with memory controller 200, in one embodiment.

As illustrated in FIG. 3, signals from a link 305 may be received by receivers 310 and variously provided to components to facilitate access to memory resources of memory device 300. By way of illustration and not limitation, write access information may be communicated to signal separation circuitry 315, including write data that is provided to a write buffer (WB) 330 and one or more commands to be provided to command processing circuitry 320. The write data may remain in write buffer 330 until an associated command and address causes it to be written into banks 335. Banks 335 may include respective memory arrays and further include or couple to various other circuitry—such as sense amplifiers, row and/or column decoders and/or the like—to provide access to such memory arrays. Decoders may also be included before banks 335. Some embodiments do not include a write buffer to hold write data in this manner. In a read access, banks 335 returns read data to internal data link 340. Transmitters 345 receive read data from link 340 and provide it to external link 350.

If a particular received command is a single activate (ACT) command, then command processing circuitry 320 provides the particular ACT command to banks 335 as a single command. However, if the read or write command is a consolidated ACT/iPRE command, then command processing circuitry 320 translates the consolidated ACT/iPRE command into two single commands—i.e., an ACT command and a distinct iPRE command, each to be provided separately to banks 335.

At a given time, the servicing of multiple consolidated ACT/iPRE commands may be taking place concurrently at memory device 300. Command processing circuitry 323 include or couple to circuitry, as represented by the illustrative tracker logic 325, that is to determine how the assertion of an iPRE command and/or an ACT command is to take place based on a consolidated ACT/iPRE command received from the memory controller. Such tracker logic may include, for example, a registry including entries for each pending consolidated ACT/iPRE command. Each such registry may store address and/or timer information indicating an ACT command to be asserted (or a timing thereof) for the corresponding consolidated ACT/iPRE command. Tracker logic 325 may further comprise monitoring circuitry to variously detect, for each pending consolidated ACT/iPRE command, whether a time period has expired to allow such an ACT command to be asserted.

Certain embodiments provide for memory device 300 to communicate to a host—e.g., to a memory controller—that a total number of allowable copending consolidated ACT/iPRE commands is less than a theoretical maximum that otherwise might be implemented according to timing parameters of memory device 300. By way of illustration and not limitation, memory device 300 may include capability logic 360 (e.g., threshold indication logic 112) comprising circuitry to store or otherwise provide information indicating a command response capability of memory device 300. For example, capability logic 360 may include or otherwise have access to a value TR 365 specifying or otherwise indicating such a total number of allowable copending consolidated ACT/iPRE commands.

For example, TR 365 may specify a maximum total number of allowable copending ACT/iPRE commands. Alternatively or in addition, TR 365 may specify a manufacturing number, model number or other product-specific identifier, wherein the memory controller includes or otherwise has access to reference information (such as a look-up table) to correspond such an identifier to a threshold number of allowable copending consolidated ACT/iPRE commands. Any of a variety of other values may be additionally or alternatively included in TRR 365 to facilitate the identification of such threshold information at a memory controller, according to different embodiments. Capability logic 360 may detect connectivity of memory device 300 to the host and, in response, send TR 365 in a communication 370 to the memory controller. Communication 370 may be exchanged via external link 350, for example.

Figure 4:
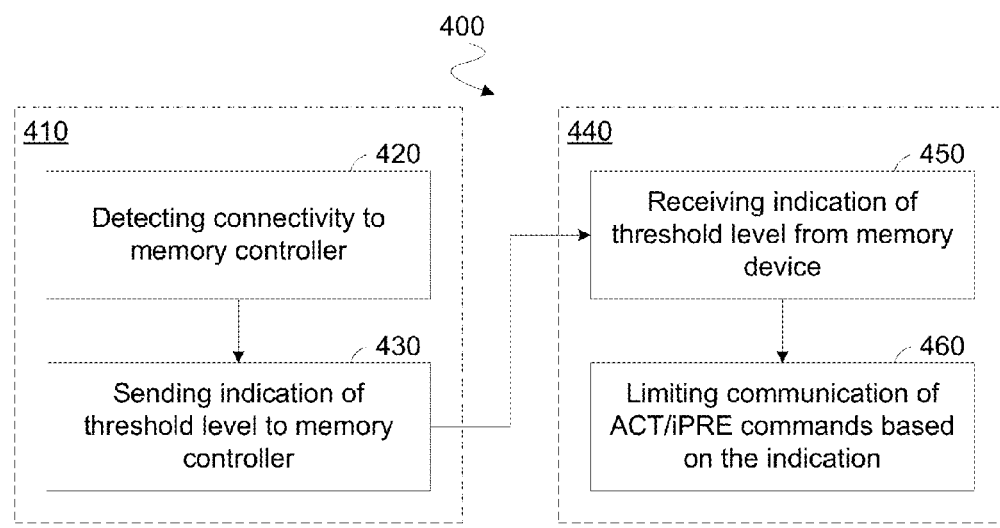
FIG. 4 is a flow diagram illustrating elements of a method for operating a memory device according to an embodiment.

FIG. 4 illustrates elements of the method 400 to configure memory accesses according to an embodiment. Method 400 may be performed by a memory system including some or all of the features of system 100, for example. In one embodiment, method 400 includes both operations 410 performed at a memory device and operations 440 performed at a memory controller that is coupled to such a memory device. However, in an alternate embodiment, method 400 includes only operations 410 or only operations 440.

Operations 410 may comprise, at 420, detecting connectivity of the memory device to the memory controller. The detecting at 420 may take place during a fabrication, assembly or other manufacturing stage of the memory system. Alternatively, the detecting at 420 may take place during or in response to a power state transition of the memory system. In response to detecting the connectivity at 420, method 400 may send to the memory controller, at 430, information indicating a threshold level of a command response capability.

For example, the memory device may send information indicating a threshold number of consolidated activation commands that may be pending at the memory device at any given time. Such a threshold number may be less than a theoretical maximum number of pending consolidated activation commands—e.g. where the theoretical maximum number might otherwise be identified by the memory controller based on timing parameters of the memory device. In one embodiment, the theoretical maximum number is defined based on a timing parameter tRP that represents a minimum time necessary for the memory device to perform a memory precharge operation. Alternatively or in addition, the theoretical maximum number may be defined based on a timing parameter tRRD representing a minimum time necessary between successive activation operations. The threshold number may be greater than one, although certain embodiments are not limited in this regard.

In one embodiment, the indication sent at 430 includes the actual threshold number of pending consolidated activation commands. In another embodiment, the indication sent at 430 includes a product identification number, wherein the memory controller accesses reference information based on the product identification number to determine the threshold number of pending consolidated activation commands. Operations 440 may include, at 450, the memory controller receiving from the memory device the information sent at 430. Based on the indication of the threshold level, the memory controller may, at 460, limit communication of consolidated ACT/iPRE commands to the memory device. For example, a determination as to whether a consolidated ACT/iPRE command is to be sent—e.g., rather than an explicit PRE command and a distinct ACT command—may be made by the memory controller based on the indicated threshold level and a current total number of consolidated ACT/iPRE commands that are pending at the memory device.

Figure 5:
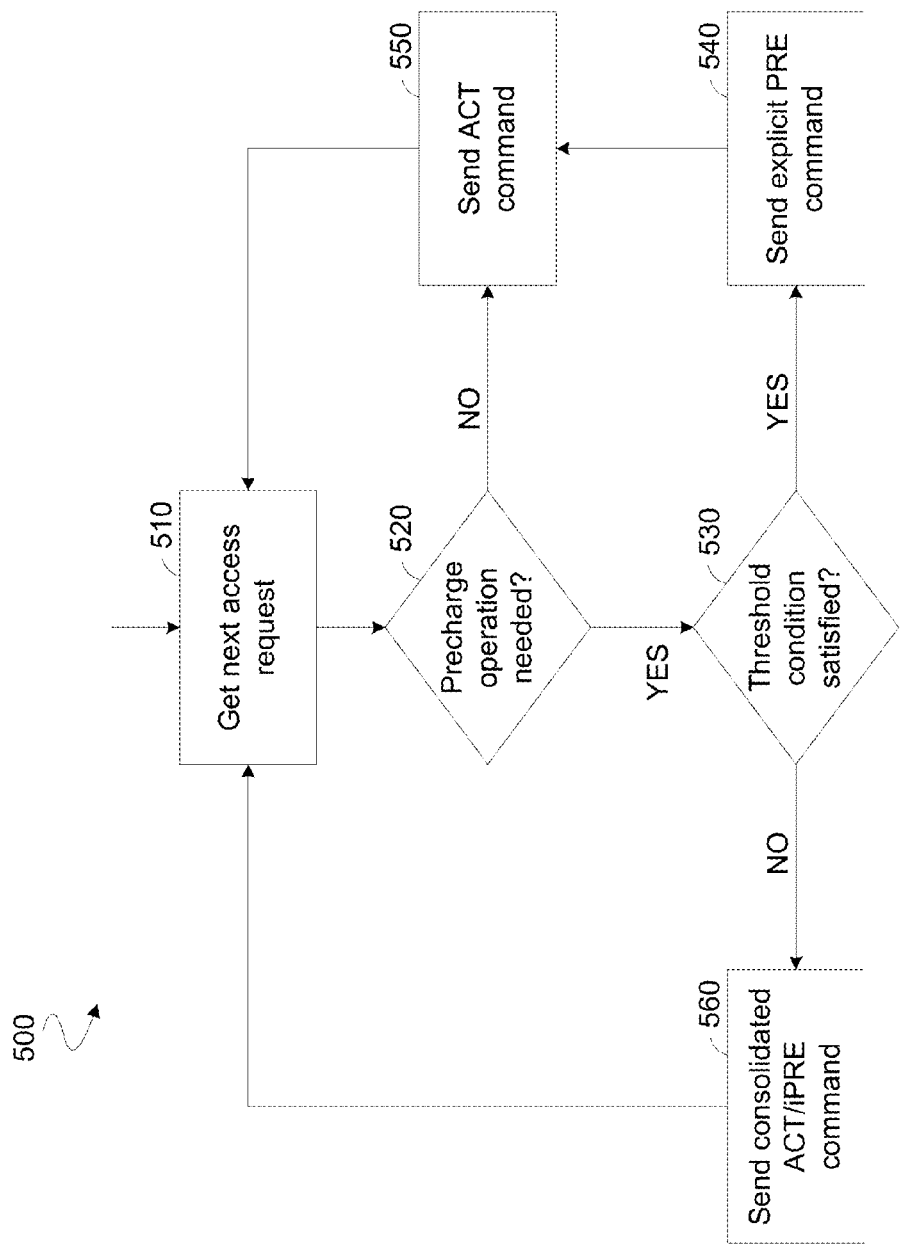
FIG. 5 is a flow diagram illustrating elements of a method for generating memory control commands according to an embodiment.

FIG. 5 is a flow chart illustrating features of a method 500 for controlling a memory device according to an embodiment. Method 500 may be performed by one of memory controllers 120, 200, for example. In an embodiment, method 500 includes or is in addition to operations 440 of method 400.

Command circuitry of the memory controller may consider a next access request to service (operation 510). The access requests under consideration for the purpose of method 500 are those for which servicing requires at least an activation operation to open a row in memory for subsequent access, and potentially an additional precharge operation to close a previously opened row in memory. A determination may be made, at 520, as to whether a precharge operation is needed to service the request. The determining at 520 may be based, at least in part, on a location in memory that is targeted by the access request retrieved at 510. For example, if the access to be serviced targets a row in memory that is currently open, then no precharge operation needs may need to be performed to close a different row, and method 500 may generate an ACT command at 550 (independent of any implicit or explicit indication that a precharge operation is to be performed).

However, if the determining at 520 indicates that a precharge operation is needed, then method 500 may determine whether to send ACT and PRE commands that are distinct from one another, or instead send a consolidated ACT/iPRE. For example, method 500 may include mode selection circuitry of the memory controller evaluating at 530 whether a threshold condition is satisfied by a current total number of consolidated ACT/iPRE commands pending at the memory device.

In some embodiments, if the number of ACT/iPRE commands currently pending at the memory device has a first relationship to a threshold number (e.g., greater than, or greater than or equal to), then the mode selection circuitry may configure a first mode of the command circuitry. Based on the first mode, method 500 may service the access request by sending (at 540) an explicit PRE command and then sending (at 550) an ACT command that is distinct from that explicit PRE command. However, if the number of ACT/iPRE commands currently pending at the memory device has a second relationship to the threshold number (e.g., less than, or less than or equal to), then the mode selection circuitry may configure a second mode of the command circuitry. Based on the second mode, method 500 may service the access request by sending a consolidated ACT/iPRE command at 560.

Figure 6:
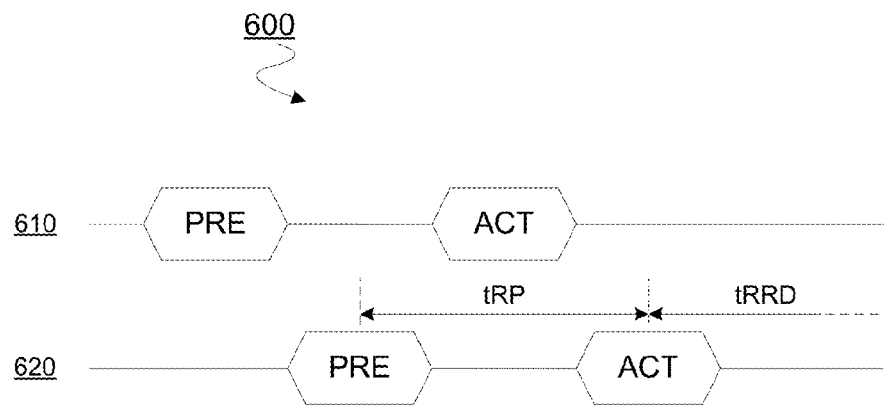
FIG. 6 is a timing diagram illustrating elements of an exchange of explicit pre-charge command signaling according to an embodiment.

FIG. 6 is a timing diagram 600 illustrating features of activation and precharge command signaling according to an embodiment. In FIG. 6, two distinct commands (PRE and ACT) are provided as signaling 610 between a memory controller and a memory device coupled thereto. These commands are also provided some time later as signaling 620 on a command link that is internal to the memory device. Signaling 610 may be exchanged in response to a determination that a current total number of consolidated ACT/iPRE commands pending at the memory device exceeds a threshold. Timing diagram shows illustrative examples of timing parameters tRP, tRRD that, but for a threshold value indicated to the memory controller, might otherwise be used by the memory controller to determine a maximum number of pending ACT/iPRE commands for the memory device.

Figure 7:
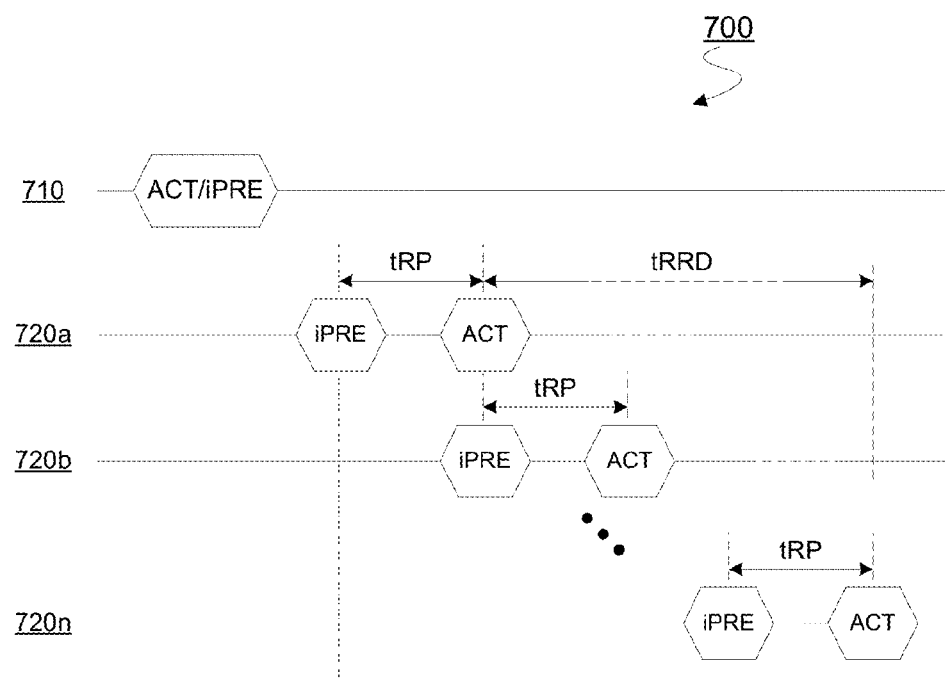
FIG. 7 is a timing diagram illustrating elements of an exchange of implicit pre-charge command signaling according to an embodiment.

FIG. 7 is a timing diagram illustrating the case in which a consolidated ACT/iPRE command is provided as signaling 710 on a link between a memory controller and a memory device, but distinct commands iPRE and ACT are provided in succession as signaling 720a some time later on a command link that is internal to the memory device. The various timings on FIGS. 6 and 7 are merely illustrative and not necessary in all embodiments.

To illustrate a theoretical maximum number of pending ACT/iPRE commands, timing diagram 700a is shown in relation to the timing of other signaling 720b, . . . 720n each for a respective hypothetical copending memory access request. In the example shown for timing diagram 700, a theoretical maximum number of pending ACT/iPRE commands is shown as being determined by a total number of tRP periods that fit into a tRRD period of a pending consolidated ACT/iPRE command. In such an embodiment, a theoretical maximum Nmax may be represented, for example, by the following equation.

$$Nmax = \left(1 + \left\lfloor \frac{tRRD}{tRP} \right\rfloor\right) \quad (1)$$

With respect to a given memory IC (or other memory device), certain embodiments variously set for a memory controller a maximum number of pending ACT/iPRE commands that is less than such a theoretical maximum Nmax.

Figure 8:
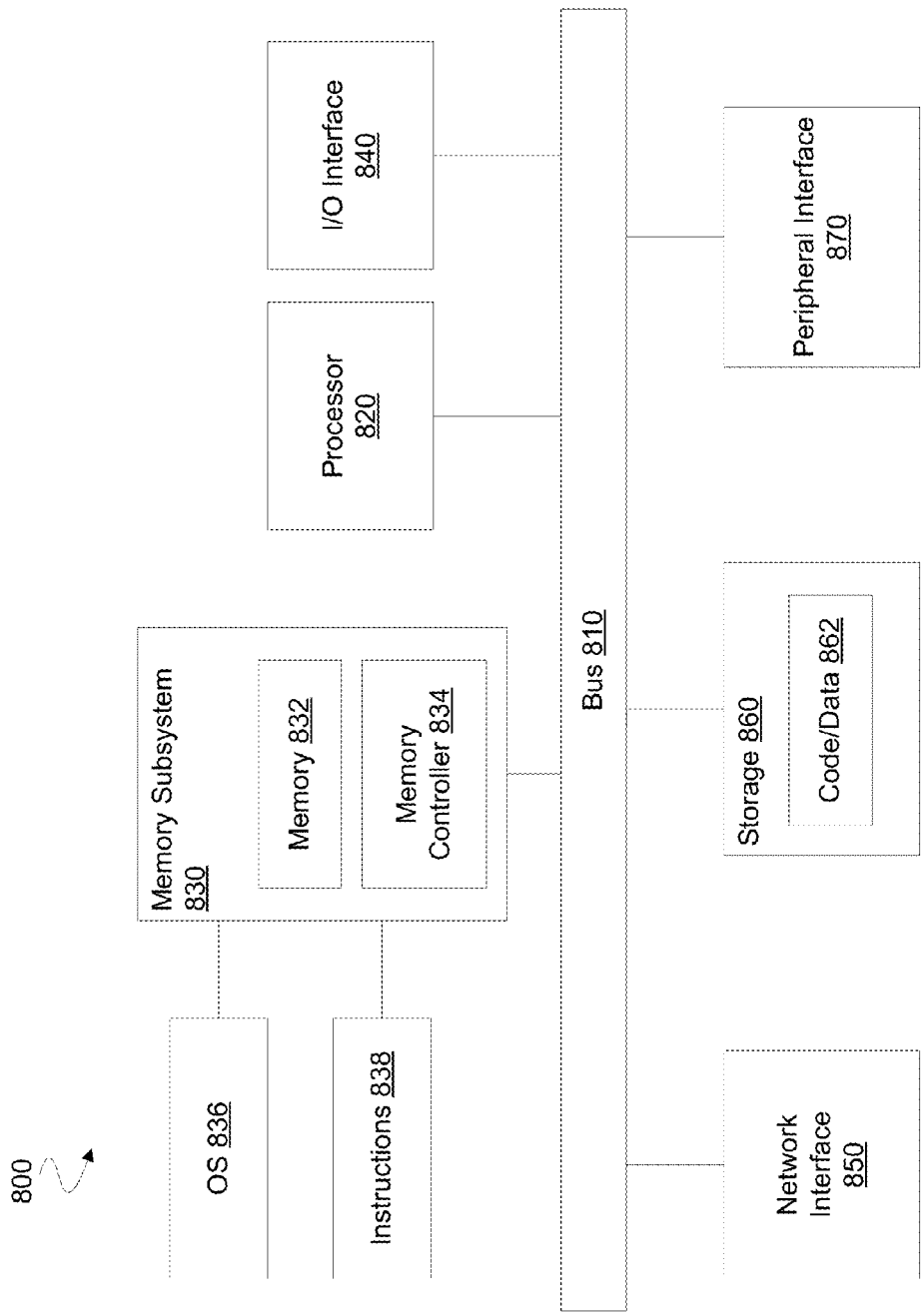
FIG. 8 is a high-level functional block diagram illustrating elements of a computing system for accessing memory resources according to an embodiment.

FIG. 8 is a block diagram of an embodiment of a computing system in which memory accesses may be implemented. System 800 represents a computing device in accordance with any embodiment described herein, and may be a laptop computer, a desktop computer, a server, a gaming or entertainment control system, a scanner, copier, printer, or other electronic device. System 800 may include processor 820, which provides processing, operation management, and execution of instructions for system 800. Processor 820 may include any type of microprocessor, central processing unit (CPU), processing core, or other processing hardware to provide processing for system 800. Processor 820 controls the overall operation of system 800, and may be or include, one or more programmable general-purpose or special-purpose microprocessors, digital signal processors (DSPs), programmable controllers, application specific integrated circuits (ASICs), programmable logic devices (PLDs), or the like, or a combination of such devices.

Memory subsystem 830 represents the main memory of system 800, and provides temporary storage for code to be executed by processor 820, or data values to be used in executing a routine. Memory subsystem 830 may include one or more memory devices such as read-only memory (ROM), flash memory, one or more varieties of random access memory (RAM), or other memory devices, or a combination of such devices. Memory subsystem 830 stores and hosts, among other things, operating system (OS) 836 to provide a software platform for execution of instructions in system 800. Additionally, other instructions 838 are stored and executed from memory subsystem 830 to provide the logic and the processing of system 800. OS 836 and instructions 838 are executed by processor 820.

Memory subsystem 830 may include memory device 832 where it stores data, instructions, programs, or other items. In one embodiment, memory subsystem includes memory controller 834, which is a memory controller in accordance with any embodiment described herein, and which provides mechanisms for accessing memory device 832. In one embodiment, memory controller 834 provides commands to memory device 832. The commands may cause memory device 832 to internally generate activate commands and/or precharge commands for memory resources.

Processor 820 and memory subsystem 830 are coupled to bus/bus system 810. Bus 810 is an abstraction that represents any one or more separate physical buses, communication lines/interfaces, and/or point-to-point connections, connected by appropriate bridges, adapters, and/or controllers. Therefore, bus 810 may include, for example, one or more of a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (commonly referred to as "Firewire"). The buses of bus 810 may also correspond to interfaces in network interface 850.

System 800 may also include one or more input/output (I/O) interface(s) 840, network interface 850, one or more internal mass storage device(s) 860, and peripheral interface 870 coupled to bus 810. I/O interface 840 may include one or more interface components through which a user interacts with system 800 (e.g., video, audio, and/or alphanumeric interfacing). Network interface 850 provides system 800 the ability to communicate with remote devices (e.g., servers, other computing devices) over one or more networks. Network interface 850 may include an Ethernet adapter, wireless interconnection components, USB (universal serial bus), or other wired or wireless standards-based or proprietary interfaces.

Storage 860 may be or include any conventional medium for storing large amounts of data in a nonvolatile manner, such as one or more magnetic, solid state, or optical based disks, or a combination. Storage 860 holds code or instructions and data 862 in a persistent state (i.e., the value is retained despite interruption of power to system 800). Storage 860 may be generically considered to be a "memory," although memory 830 is the executing or operating memory to provide instructions to processor 820. Whereas storage 860 is nonvolatile, memory 830 may include volatile memory (i.e., the value or state of the data is indeterminate if power is interrupted to system 800).

Peripheral interface 870 may include any hardware interface not specifically mentioned above. Peripherals refer generally to devices that connect dependently to system 800. A dependent connection is one where system 800 provides the software and/or hardware platform on which an operation executes, and with which a user interacts.

Figure 9:
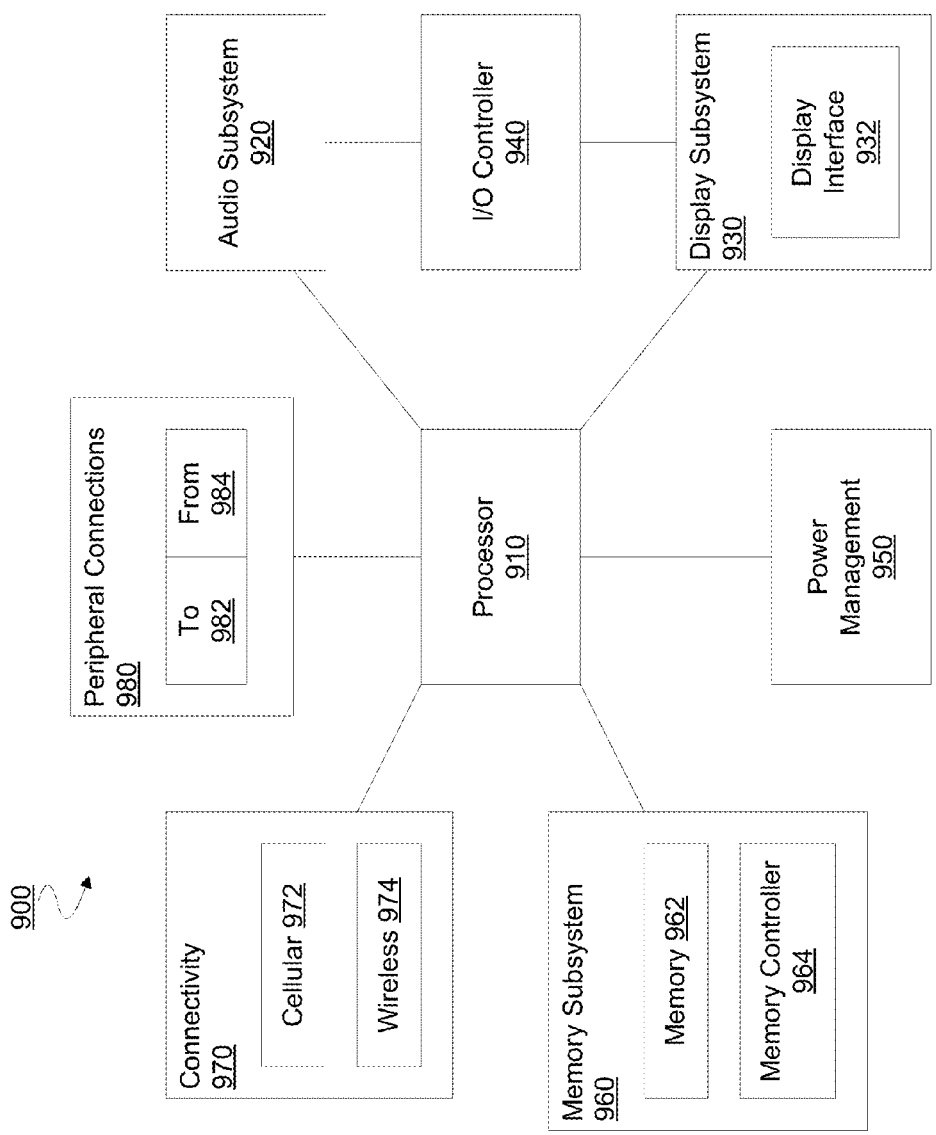
FIG. 9 is a high-level functional block diagram illustrating elements of a mobile device for accessing memory resources according to an embodiment.

FIG. 9 is a block diagram of an embodiment of a mobile device in which memory accesses may be implemented. Device 900 represents a mobile computing device, such as a computing tablet, a mobile phone or smartphone, a wireless-enabled e-reader, or other mobile device. It will be understood that certain of the components are shown generally, and not all components of such a device are shown in device 900.

Device 900 may include processor 910, which performs the primary processing operations of device 900. Processor 910 may include one or more physical devices, such as microprocessors, application processors, microcontrollers, programmable logic devices, or other processing means. The processing operations performed by processor 910 include the execution of an operating platform or operating system on which applications and/or device functions are executed. The processing operations include operations related to I/O (input/output) with a human user or with other devices, operations related to power management, and/or operations related to connecting device 900 to another device. The processing operations may also include operations related to audio I/O and/or display I/O.

In one embodiment, device 900 includes audio subsystem 920, which represents hardware (e.g., audio hardware and audio circuits) and software (e.g., drivers, codecs) components associated with providing audio functions to the computing device. Audio functions may include speaker and/or headphone output, as well as microphone input. Devices for such functions may be integrated into device 900, or connected to device 900. In one embodiment, a user interacts with device 900 by providing audio commands that are received and processed by processor 910.

Display subsystem 930 represents hardware (e.g., display devices) and software (e.g., drivers) components that provide a visual and/or tactile display for a user to interact with the computing device. Display subsystem 930 may include display interface 932, which may include the particular screen or hardware device used to provide a display to a user. In one embodiment, display interface 932 includes logic separate from processor 910 to perform at least some processing related to the display. In one embodiment, display subsystem 930 includes a touchscreen device that provides both output and input to a user.

I/O controller 940 represents hardware devices and software components related to interaction with a user. I/O controller 940 may operate to manage hardware that is part of audio subsystem 920 and/or display subsystem 930. Additionally, I/O controller 940 illustrates a connection point for additional devices that connect to device 900 through which a user might interact with the system. For example, devices that may be attached to device 900 might include microphone devices, speaker or stereo systems, video systems or other display device, keyboard or keypad devices, or other I/O devices for use with specific applications such as card readers or other devices.

As mentioned above, I/O controller 940 may interact with audio subsystem 920 and/or display subsystem 930. For example, input through a microphone or other audio device may provide input or commands for one or more applications or functions of device 900. Additionally, audio output may be provided instead of or in addition to display output. In another example, if display subsystem includes a touchscreen, the display device also acts as an input device, which may be at least partially managed by I/O controller 940. There may also be additional buttons or switches on device 900 to provide I/O functions managed by I/O controller 940.

In one embodiment, I/O controller 940 manages devices such as accelerometers, cameras, light sensors or other environmental sensors, gyroscopes, global positioning system (GPS), or other hardware that may be included in device 900. The input may be part of direct user interaction, as well as providing environmental input to the system to influence its operations (such as filtering for noise, adjusting displays for brightness detection, applying a flash for a camera, or other features).

In one embodiment, device 900 includes power management 950 that manages battery power usage, charging of the battery, and features related to power saving operation. Memory subsystem 960 may include memory device(s) 962 for storing information in device 900. Memory subsystem 960 may include nonvolatile (state does not change if power to the memory device is interrupted) and/or volatile (state is indeterminate if power to the memory device is interrupted) memory devices. Memory 960 may store application data, user data, music, photos, documents, or other data, as well as system data (whether long-term or temporary) related to the execution of the applications and functions of system 900.

In one embodiment, memory subsystem 960 includes memory controller 964 (which could also be considered part of the control of system 900, and could potentially be considered part of processor 910). Memory controller 964 monitors voltage swing characteristics of a bus. For example, memory controller 964 may detect different voltage swing characteristics for different signal lines of the same bus—e.g. a data bus. In an embodiment, memory controller 964 issues commands which cause memory 962 to internally generate an activate command or a precharge command for memory resources.

Connectivity 970 may include hardware devices (e.g., wireless and/or wired connectors and communication hardware) and software components (e.g., drivers, protocol stacks) to enable device 900 to communicate with external devices. The device could be separate devices, such as other computing devices, wireless access points or base stations, as well as peripherals such as headsets, printers, or other devices.

Connectivity 970 may include multiple different types of connectivity. To generalize, device 900 is illustrated with cellular connectivity 972 and wireless connectivity 974. Cellular connectivity 972 refers generally to cellular network connectivity provided by wireless carriers, such as provided via GSM (global system for mobile communications) or variations or derivatives, CDMA (code division multiple access) or variations or derivatives, TDM (time division multiplexing) or variations or derivatives, LTE (long term evolution—also referred to as "4G"), or other cellular service standards. Wireless connectivity 974 refers to wireless connectivity that is not cellular, and may include personal area networks (such as Bluetooth), local area networks (such as WiFi), and/or wide area networks (such as WiMax), or other wireless communication. Wireless communication refers to transfer of data through the use of modulated electromagnetic radiation through a non-solid medium. Wired communication occurs through a solid communication medium.

Peripheral connections 980 include hardware interfaces and connectors, as well as software components (e.g., drivers, protocol stacks) to make peripheral connections. It will be understood that device 900 could both be a peripheral device ("to" 982) to other computing devices, as well as have peripheral devices ("from" 984) connected to it. Device 900 commonly has a "docking" connector to connect to other computing devices for purposes such as managing (e.g., downloading and/or uploading, changing, synchronizing) content on device 900. Additionally, a docking connector may allow device 900 to connect to certain peripherals that allow device 900 to control content output, for example, to audiovisual or other systems.

In addition to a proprietary docking connector or other proprietary connection hardware, device 900 may make peripheral connections 980 via common or standards-based connectors. Common types may include a Universal Serial Bus (USB) connector (which may include any of a number of different hardware interfaces), DisplayPort including MiniDisplayPort (MDP), High Definition Multimedia Interface (HDMI), Firewire, or other type.

In one implementation, a memory device comprises one or more arrays of memory cells, an input/output interface to detect connectivity of the memory device to a memory controller, and threshold identification logic to send to the memory controller information indicating a threshold number of pending consolidated activation commands to access the one or more arrays of memory cells, wherein a consolidated activation command indicates a precharge command, wherein the threshold number is less than a theoretical maximum number of pending consolidated activation commands, wherein the theoretical maximum number is based on timing parameters of the memory device, and wherein the memory controller limits communication of consolidated activation commands to the memory device based on the information indicating the threshold number.

In an embodiment, the theoretical maximum number is based on a timing parameter tRP representing a minimum time necessary to perform a memory precharge operation, and a timing parameter tRRD representing a minimum time necessary between successive activation operations. In another embodiment, the theoretical maximum number is equal to a sum of one and an integer equal to a floor function value based on a ratio of tRRD to tRP. In another embodiment, the threshold number is greater than one. In another embodiment, the information indicating the threshold number of pending consolidated activation commands includes the threshold number of pending consolidated activation commands. In another embodiment, wherein the information indicating the threshold number of pending consolidated activation commands includes a product identifier number, wherein the memory controller accesses reference data based on the product identification number to determine the threshold number of pending consolidated activation commands.

In another implementation, a memory controller comprises an input/output interface to couple the memory controller to a memory device, and mode selection circuitry to receive information indicating a threshold number of pending consolidated activation commands to access the memory device, wherein a consolidated activation command indicates a precharge command, wherein the threshold number is less than a theoretical maximum number of pending consolidated activation commands, wherein the theoretical maximum number is based on timing parameters of the memory device. The memory controller further comprises command logic to communicate consolidated activation commands to the memory device, wherein the mode selection logic to limit communication of consolidated activation commands to the memory device based on the information indicating the threshold number.

In an embodiment, the theoretical maximum number is based on a timing parameter tRP representing a minimum time necessary to perform a memory precharge operation, and a timing parameter tRRD representing a minimum time necessary between successive activation operations. In another embodiment, the theoretical maximum number is equal to a sum of one and an integer equal to a floor function value based on a ratio of tRRD to tRP. In another embodiment, the threshold number is greater than one. In another embodiment, the information indicating the threshold number of pending consolidated activation commands includes the threshold number of pending consolidated activation commands. In another embodiment, the information indicating the threshold number of pending consolidated activation commands includes a product identifier number, wherein the memory controller accesses reference data based on the product identification number to determine the threshold number of pending consolidated activation commands.

In another implementation, a method at a memory device comprises detecting connectivity of the memory device to a memory controller, and in response to detecting the connectivity, sending to the memory controller information indicating a threshold number of pending consolidated activation commands to access the memory device, wherein a consolidated activation command indicates a precharge command, wherein the threshold number is less than a theoretical maximum number of pending consolidated activation commands, the theoretical maximum number based on timing parameters of the memory device, wherein the memory controller limits communication of consolidated activation commands to the memory device based on the information indicating the threshold number.

In an embodiment, the theoretical maximum number is based on a timing parameter tRP representing a minimum time necessary to perform a memory precharge operation, and a timing parameter tRRD representing a minimum time necessary between successive activation operations. In another embodiment, the theoretical maximum number is equal to a sum of one and an integer equal to a floor function value based on a ratio of tRRD to tRP. In another embodiment, the threshold number is greater than one. In another embodiment, the information indicating the threshold number of pending consolidated activation commands includes the threshold number of pending consolidated activation commands. In another embodiment, the information indicating the threshold number of pending consolidated activation commands includes a product identifier number, wherein the memory controller accesses reference data based on the product identification number to determine the threshold number of pending consolidated activation commands.

In another implementation, a method at a memory controller comprises receiving information indicating a threshold number of pending consolidated activation commands to access a memory device coupled to the memory controller, wherein a consolidated activation command indicates a precharge command, wherein the threshold number is less than a theoretical maximum number of pending consolidated activation commands, wherein the theoretical maximum number is based on timing parameters of the memory device, and limiting a communication of consolidated activation commands to the memory device based on the information indicating the threshold number.

In an embodiment, the theoretical maximum number is based on a timing parameter tRP representing a minimum time necessary to perform a memory precharge operation, and a timing parameter tRRD representing a minimum time necessary between successive activation operations. In another embodiment, the theoretical maximum number is equal to a sum of one and an integer equal to a floor function value based on a ratio of tRRD to tRP. In another embodiment, the threshold number is greater than one. In another embodiment, the information indicating the threshold number of pending consolidated activation commands includes the threshold number of pending consolidated activation commands. In another embodiment, the information indicating the threshold number of pending consolidated activation commands includes a product identifier number, wherein the memory controller accesses reference data based on the product identification number to determine the threshold number of pending consolidated activation commands.

In another implementation, a computer-readable storage medium has stored thereon instructions which, when executed by one or more processing units, cause a memory controller to perform a method comprises receiving information indicating a threshold number of pending consolidated activation commands to access a memory device coupled to the memory controller, wherein a consolidated activation command indicates a precharge command, wherein the threshold number is less than a theoretical maximum number of pending consolidated activation commands, wherein the theoretical maximum number is based on timing parameters of the memory device, and limiting a communication of consolidated activation commands to the memory device based on the information indicating the threshold number.

In an embodiment, the theoretical maximum number is based on a timing parameter tRP representing a minimum time necessary to perform a memory precharge operation, and a timing parameter tRRD representing a minimum time necessary between successive activation operations. In another embodiment, the theoretical maximum number is equal to a sum of one and an integer equal to a floor function value based on a ratio of tRRD to tRP. In another embodiment, the threshold number is greater than one. In another embodiment, the information indicating the threshold number of pending consolidated activation commands includes the threshold number of pending consolidated activation commands. In another embodiment, the information indicating the threshold number of pending consolidated activation commands includes a product identifier number, wherein the memory controller accesses reference data based on the product identification number to determine the threshold number of pending consolidated activation commands.

Techniques and architectures for accessing memory resources are described herein. In the above description, for purposes of explanation, numerous specific details are set forth in order to provide a thorough understanding of certain embodiments. It will be apparent, however, to one skilled in the art that certain embodiments can be practiced without these specific details. In other instances, structures and devices are shown in block diagram form in order to avoid obscuring the description.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed description herein are presented in terms of algorithms and symbolic representations of operations on data bits within a computer memory. These algorithmic descriptions and representations are the means used by those skilled in the computing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion herein, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Certain embodiments also relate to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs) such as dynamic RAM (DRAM), EPROMs, EEPROMs, magnetic or optical cards, or any type of media suitable for storing electronic instructions, and coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description herein. In addition, certain embodiments are not described with reference to any particular programming language. It will be appreciated that a variety of programming languages may be used to implement the teachings of such embodiments as described herein.

Besides what is described herein, various modifications may be made to the disclosed embodiments and implementations thereof without departing from their scope. Therefore, the illustrations and examples herein should be construed in an illustrative sense, and not a restrictive sense. The scope of the invention should be measured solely by reference to the claims that follow.

What is claimed is:

1. A memory device comprising:
an input/output interface to couple the memory device to a memory controller and further to receive from the memory controller consolidated commands to access one or more arrays of memory cells;
threshold identification circuitry coupled to the input/output interface, the threshold identification circuitry configured to identify to the memory controller a threshold number of co-pending consolidated commands, the threshold number less than a theoretical maximum number of pending consolidated commands, wherein the memory controller is to limit communication of the consolidated commands based on the threshold number.

2. The memory device of claim 1, wherein the theoretical maximum number is based on the timing parameters of the memory device including:
a timing parameter tRP representing a minimum time necessary to perform a memory precharge operation; and
a timing parameter tRRD representing a minimum time necessary between successive activation operations.

3. The memory device of claim 2, wherein the theoretical maximum number represents a total number of times a first time duration can take place in a second time duration, the first time duration corresponding to tRP, the second time duration corresponding to tRRD.

4. The memory device of claim 1, wherein a consolidated activation command represents a combination of an activation command and a precharge command.

5. The memory device of claim 1, wherein the one or more arrays of memory cells include a dynamic random access memory.

6. The memory device of claim 1, wherein the consolidated commands conform to a dual data rate specification.

7. A system comprising:
a central processing unit (CPU);
a memory controller coupled to the CPU;
a memory device including:
one or more arrays of dynamic random access memory (DRAM) cells;
an input/output interface coupled to receive from the memory controller consolidated commands to access one or more arrays of memory cells, wherein the consolidated commands conform to a dual data rate specification, wherein the input/output interface couples the memory device to the CPU via the memory controller;
threshold identification circuitry coupled to the input/output interface, the threshold identification circuitry configured to identify to the memory controller a threshold number of co-pending consolidated commands, the threshold number less than a theoretical maximum number of pending consolidated commands, wherein the memory controller is to limit communication of the consolidated commands based on the threshold number.

8. The system of claim 7, wherein the theoretical maximum number is based on the timing parameters of the memory device including:
a timing parameter tRP representing a minimum time necessary to perform a memory precharge operation; and
a timing parameter tRRD representing a minimum time necessary between successive activation operations.

9. The system of claim 8, wherein the theoretical maximum number represents a total number of times a first time duration can take place in a second time duration, the first time duration corresponding to tRP, the second time duration corresponding to tRRD.

10. The system of claim 7, wherein a consolidated activation command represents a combination of an activation command and a precharge command.

11. The system of claim 7, wherein the one or more arrays of memory cells include a dynamic random access memory.

12. A method at a memory device, the method comprising:
   receiving consolidated commands from a memory controller coupled to the memory device, the consolidated commands to access one or more arrays of memory cells; and
   identifying to the memory controller a threshold number of co-pending consolidated commands, the threshold number less than a theoretical maximum number of pending consolidated commands, wherein the memory controller limits communication of the consolidated commands to the memory device based on the threshold number.

13. The method of claim 12, wherein the theoretical maximum number is based on the timing parameters of the memory device including:
   a timing parameter tRP representing a minimum time necessary to perform a memory precharge operation; and
   a timing parameter tRRD representing a minimum time necessary between successive activation operations.

14. The method of claim 13, wherein the theoretical maximum number represents a total number of times a first time duration can take place in a second time duration, the first time duration corresponding to tRP, the second time duration corresponding to tRRD.

15. The method of claim 12, wherein a consolidated activation command represents a combination of an activation command and a precharge command.

16. The method of claim 12, wherein the one or more arrays of memory cells include a dynamic random access memory.

17. The method of claim 12, wherein the consolidated commands conform to a dual data rate specification.

* * * * *